US005535213A

United States Patent [19]
Pan et al.

[11] Patent Number: 5,535,213
[45] Date of Patent: Jul. 9, 1996

[54] RING CONFIGURATOR FOR SYSTEM INTERCONNECTION USING FULLY COVERED RINGS

[75] Inventors: Shien-Tai Pan, Travis County, Tex.; Ting Cheng, Putnam County; Christos J. Georgiou, Westchester County, both of N.Y.; George W. Nation, Olmsted County, Minn.; Chung-Sheng Li, Westchester County, N.Y.

[73] Assignee: International Business Machines Corporation, Armonk, N.Y.

[21] Appl. No.: 355,862

[22] Filed: Dec. 14, 1994

[51] Int. Cl.$^6$ ........................................ H04J 15/00
[52] U.S. Cl. .................. 370/85.15; 370/54; 370/85.12; 370/85.2; 370/85.5; 370/85.1
[58] Field of Search ........................ 370/54, 55, 85.15, 370/94.1, 94.3, 85.12, 85.5, 85.2, 85.1

[56] References Cited

U.S. PATENT DOCUMENTS

| | | | |
|---|---|---|---|
| 4,621,362 | 11/1986 | Sy | 370/85.14 |
| 5,041,963 | 8/1991 | Ebersole et al. | 395/200.2 |
| 5,093,824 | 5/1992 | Coan et al. | 370/16 |
| 5,216,670 | 6/1993 | Ofek et al. | 370/85.14 |
| 5,297,137 | 5/1994 | Ofek et al. | 370/60 |

OTHER PUBLICATIONS

Balliet, et al., "Bus Architecture for Passive Fault–Tolerant Command/Response System", Aug. 1986, IBM Technical Disclosure Bulletin V29 N3, pp. 1313–1317.
Christian, "Atomic Broadcast Protocol for Redundant Broadcast Channels", Mar. 1990, IBM Technical Disclosure Bulletin V32 N10B, pp. 319–321.
Dixon, "Group Address Structure for Network Service Nodes", Aug. 1983, IBM Technical Disclosure Bulleting V26 N3A, pp. 1198–1200.
Lanier, et al., "Bandwidth Usage in Peer–to–Peer Closed Rings", Sep. 1983, IBM Technical Disclosure Bulletin V26 N4, pp. 1865–1869.
Volk, "Multiplex Interface Control in a Closed–Ring Network", Oct. 1983, IBM Technical Disclosure Bulletin V26 N5, pp. 2272–2275.
Chen, et al. "Auxiliary Lookup Register for Switches in Multi–Ring Networks", Feb. 1994, IBM Technical Disclosure Bulletin V37 N02A, pp. 355–356.

*Primary Examiner*—Douglas W. Olms
*Assistant Examiner*—Melissa Kay Carman
*Attorney, Agent, or Firm*—Whitham, Curtis, Whitham & McGinn; Volel Emile

[57] ABSTRACT

A ring configurator for interconnection of data processing and communication systems uses fully covered rings. The ring configuration mechanism can be used to construct a set of covering rings preserving full connectivity for system interconnect. The mechanism can also be used for establishing the routing table for each interconnected system during the system initialization time. To generate a set of edge-disjoint rings, a rotational mechanism is used. The rings are considered stretching along a horizontal direction with nodes aligned in columns across all the rings. With a proper relabeling of the nodes, nodes appearing in the same column position of each ring can be obtained by a simple rotation of the nodes from the previous column of the rings. Once the rotational position is determined for each column, a set of N–1 edge-disjoint rings can be constructed. To find an extra ring so that when combined with the N–1 rings thus found the ring constraints are satisfied, a node reduction technique is invoked. The procedure can be repeated until a set of N edge-disjoint rings satisfying the constraints are found.

9 Claims, 11 Drawing Sheets

Edge–Disjoint Rings

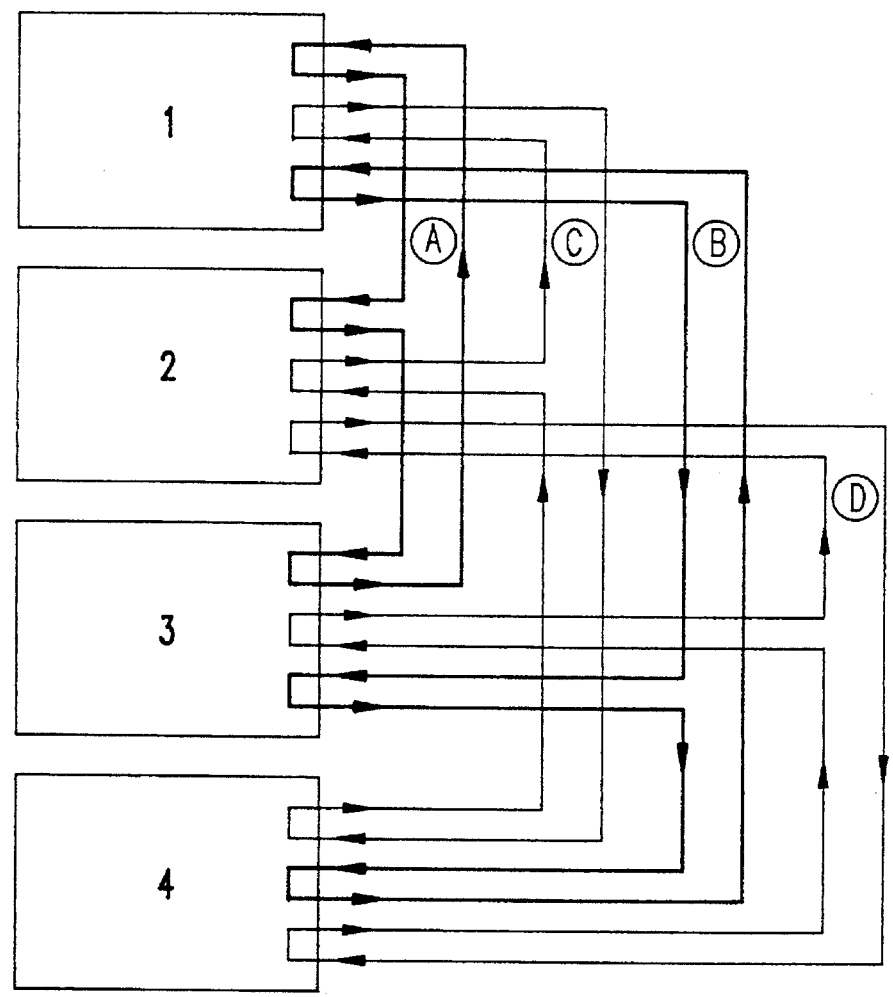
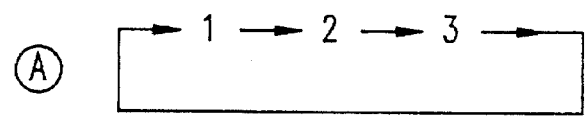
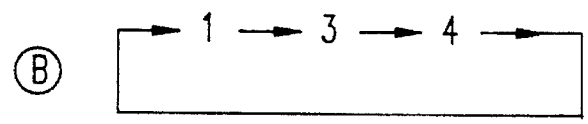
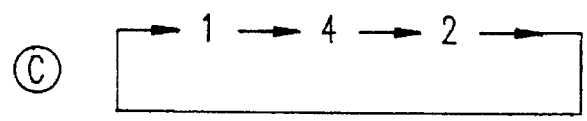
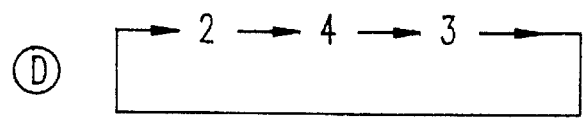
FIG.3
*PRIOR ART*

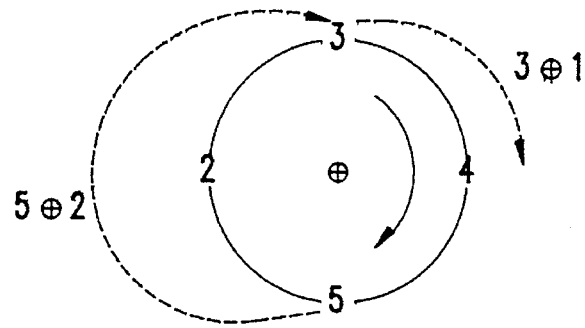
FIG.4
```
Columns:    1      2      3      4
            ↓      ↓      ↓      ↓
        1 → 2  →  3  →  5  →  Loop Back
        1 → 3  →  4  →  2  →  Loop Back
        1 → 4  →  5  →  3  →  Loop Back
        1 → 5  →  2  →  4  →  Loop Back
       ------------------------------------
        2 → 5  →  4  →  3  →  Loop Back
```
FIG.5
*PRIOR ART*
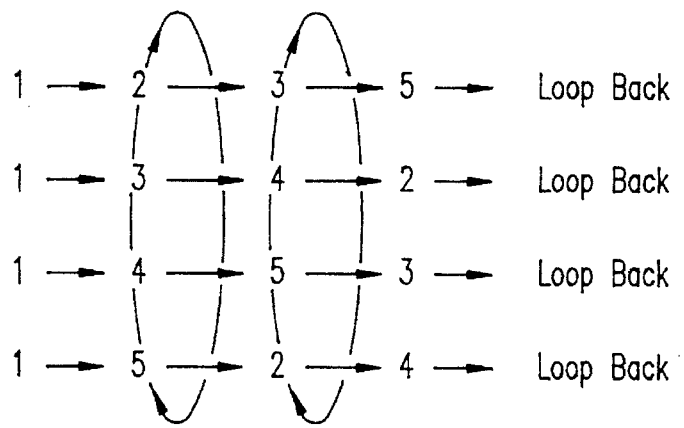
FIG.6

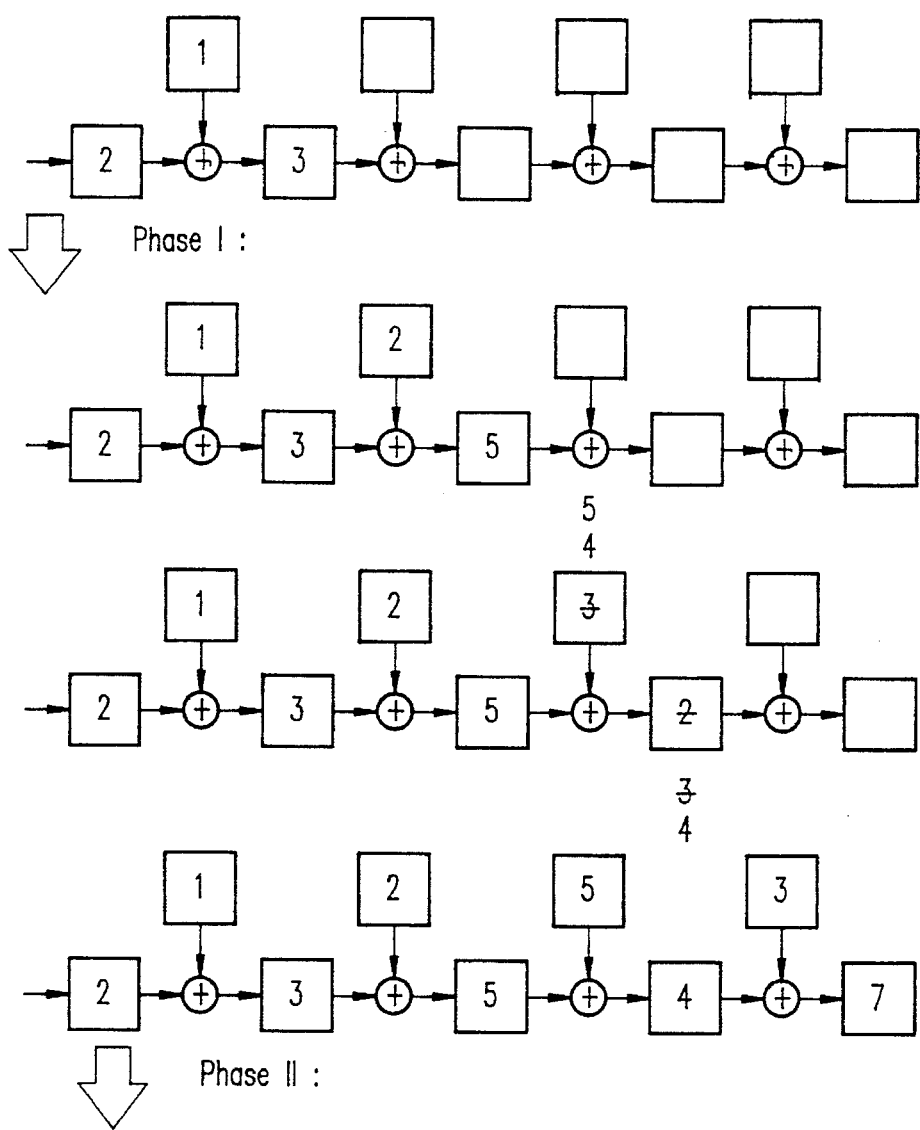
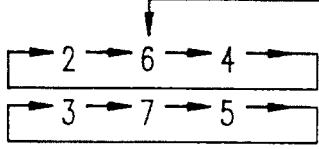
FIG.8A

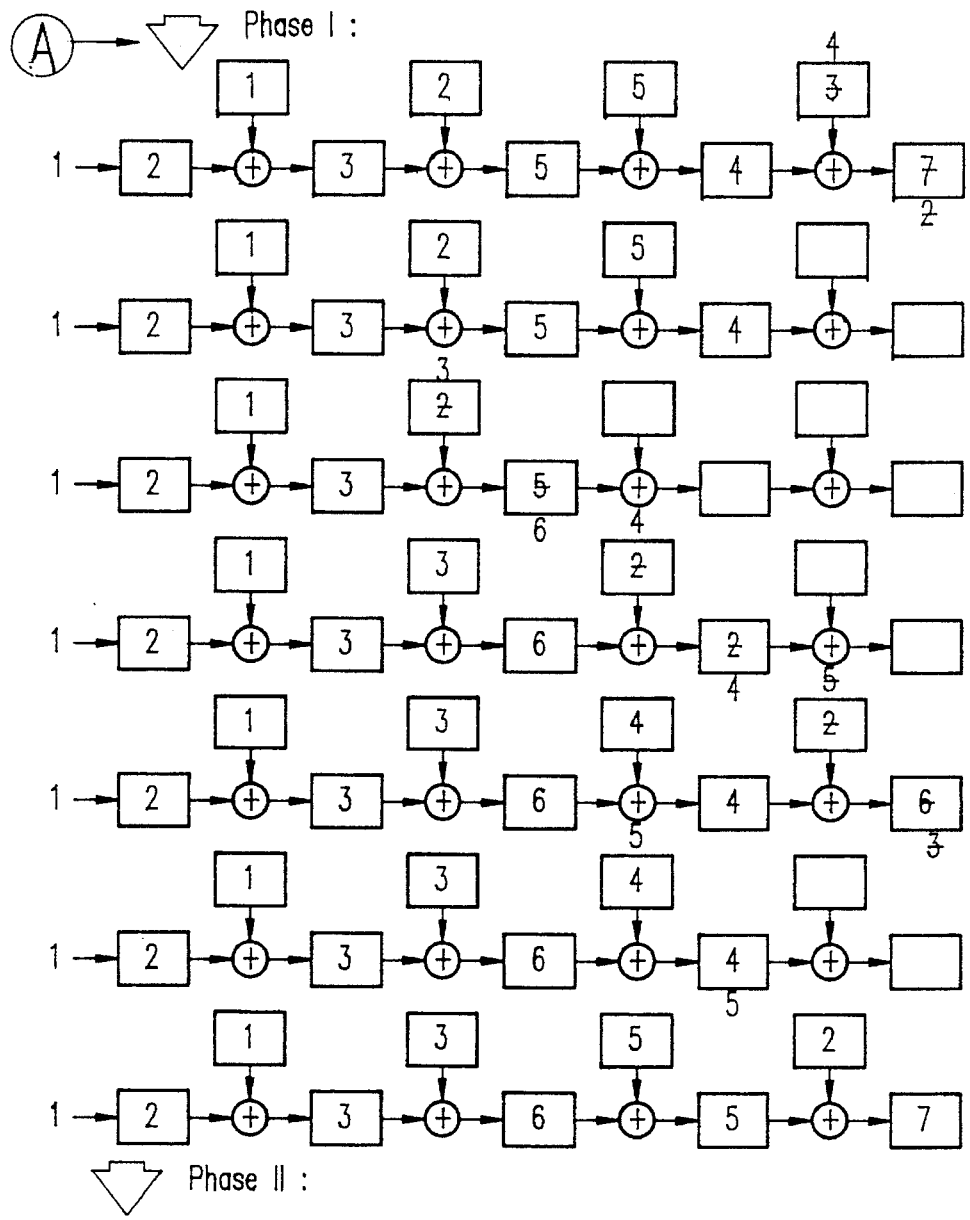
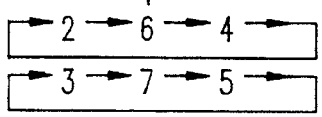
FIG.8B

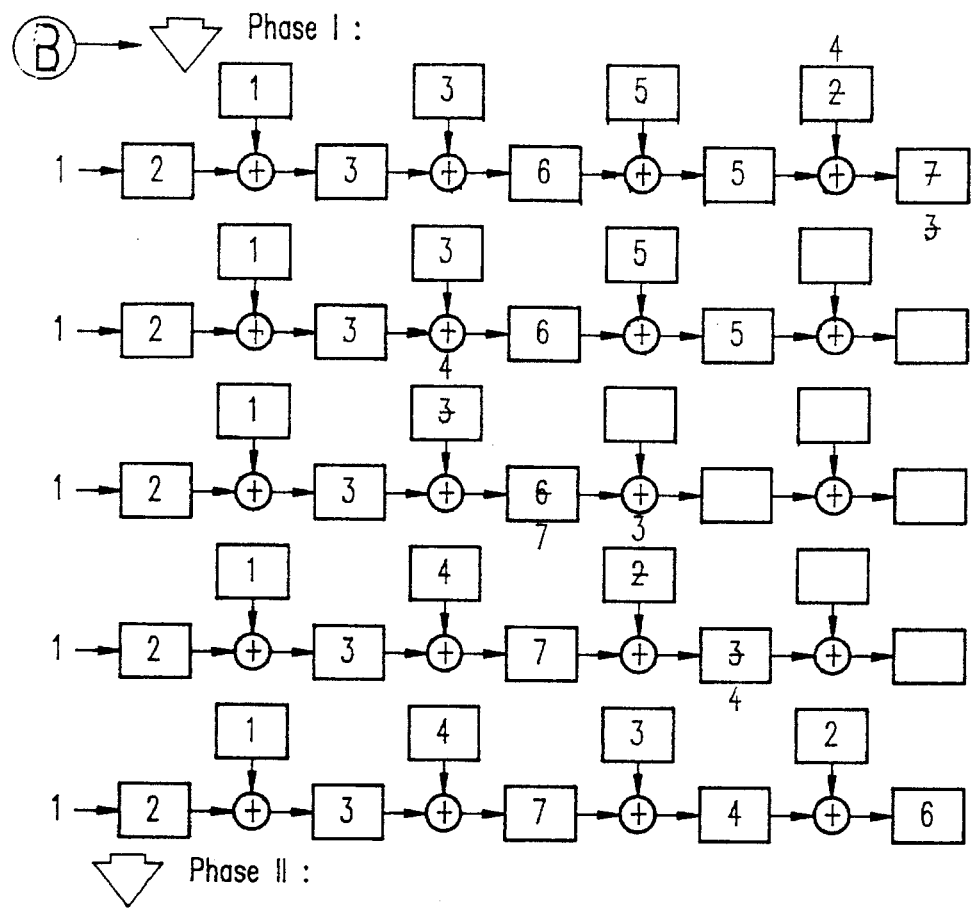
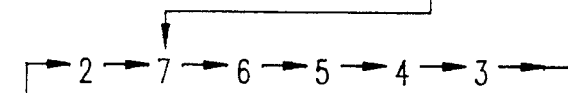
Single Ring! Stop. Other Rings Are:
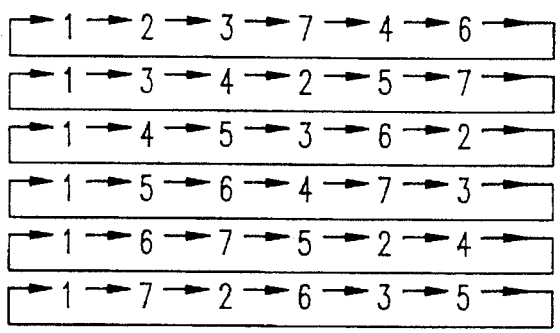
FIG.8C

| k=2 | $d_j$ | $a_j$ | $a_j \oplus d_j$ | $A[a_j] = A[a_j] - (a_j \oplus d_j)$ |
|---|---|---|---|---|
| j=1 | 1 | 2 → 3 | | A[2]=A[2]-3=25-3=22 |
| j=2 | 2 | 3 ⇄ 5 | | A[3]=A[3]-5=24-5=19 |
| j=3 | 5 | 5 ⇄ 4 | | A[5]=A[5]-4=22-4=18 |
| j=4 | 3 | 4 → 7 | | A[4]=A[4]-7=23-7=16 |

| k=3 | $d_j$ | $a_j$ | $a_j \oplus d_j$ | $A[a_j] = A[a_j] - (a_j \oplus d_j)$ |
|---|---|---|---|---|
| j=1 | 1 | 3 → 4 | | A[3]=A[3]-4=19-4=15 |
| j=2 | 2 | 4 ⇄ 6 | | A[4]=A[4]-6=16-6=10 |
| j=3 | 5 | 6 ⇄ 5 | | A[6]=A[6]-5=21-5=16 |
| j=4 | 3 | 5 ⇄ 2 | | A[5]=A[5]-2=18-2=16 |

| k=4 | $d_j$ | $a_j$ | $a_j \oplus d_j$ | $A[a_j] = A[a_j] - (a_j \oplus d_j)$ |
|---|---|---|---|---|
| j=1 | 1 | 4 → 5 | | A[4]=A[4]-5=10-5=5 |
| j=2 | 2 | 5 ⇄ 7 | | A[5]=A[5]-6=16-7=9 |
| j=3 | 5 | 7 ⇄ 6 | | A[7]=A[7]-6=20-6=14 |
| j=4 | 3 | 6 ⇄ 3 | | A[6]=A[6]-3=16-3=13 |

| k=5 | $d_j$ | $a_j$ | $a_j \oplus d_j$ | $A[a_j] = A[a_j] - (a_j \oplus d_j)$ |
|---|---|---|---|---|
| j=1 | 1 | 5 → 6 | | A[5]=A[5]-6=9-6=3 |
| j=2 | 2 | 6 ⇄ 2 | | A[6]=A[6]-2=13-2=11 |
| j=3 | 5 | 2 ⇄ 7 | | A[2]=A[2]-7=22-7=15 |
| j=4 | 3 | 7 ⇄ 4 | | A[7]=A[7]-4=14-4=10 |

| k=6 | $d_j$ | $a_j$ | $a_j \oplus d_j$ | $A[a_j] = A[a_j] - (a_j \oplus d_j)$ |
|---|---|---|---|---|
| j=1 | 1 | 6 → 7 | | A[6]=A[6]-7=11-7=4 |
| j=2 | 2 | 7 ⇄ 3 | | A[7]=A[7]-3=10-3=7 |
| j=3 | 5 | 3 ⇄ 2 | | A[3]=A[3]-2=15-2=13 |
| j=4 | 3 | 2 ⇄ 5 | | A[2]=A[2]-5=15-5=10 |

| k=7 | $d_j$ | $a_j$ | $a_j \oplus d_j$ | $A[a_j] = A[a_j] - (a_j \oplus d_j)$ |
|---|---|---|---|---|
| j=1 | 1 | 7 → 2 | | A[7]=A[7]-2=7-2=5 |
| j=2 | 2 | 2 → 4 | | A[2]=A[2]-4=10-4=6 |
| j=3 | 5 | 4 ⇄ 3 | | A[4]=A[4]-3=5-3=2 |
| j=4 | 3 | 3 ⇄ 6 | | A[3]=A[3]-6=13-6=7 |

Last Value: A[2]=6, A[3]=7, A[4]=2, A[5]=3, A[6]=4, A[7]=5

FIG.10

RING CONFIGURATOR FOR SYSTEM INTERCONNECTION USING FULLY COVERED RINGS

BACKGROUND OF THE INVENTION

1. Field of the Invention

The present invention generally relates to the interconnection of nodes in data processing and communication systems and, more particularly, to a fast ring configuration mechanism that can be used to adaptively generate a consistent set of routing tables in each node of the network to facilitate passing data packets via a shortest path and/or a least congested path in the network.

2. Description of the Prior Art

There are many applications, including distributed systems, message passing clustering systems, loosely-coupled multi-processor systems, packet-switched networks, and the like which may be broadly described as a network of nodes interconnected by communication links. These applications tend to be very complex in practice. For the proper routing of data packets in the network, each node must have knowledge of its interconnection in the network relative to other nodes in the network. With this knowledge, a node can determine the shortest path to any other node in the network. In some cases, however, the shortest path may not be the fastest path to a destination node if that path is congested with other traffic. In such case, it is desirable to be able to determine at any node an alternative path which will result in the fastest transmission of a data packet to a destination node, given a current level of traffic in the network. Furthermore, when a node or nodes are added to or removed from the network, it is necessary to update the information at each node. A closely related problem involves fault tolerance of the network, as when a link between two nodes is broken, it is also necessary to provide the nodes with sufficient information necessary to choose an alternate path.

Various techniques are known for routing data packets over a multi-node data processing or communications network, and more specifically for routing each packet from an entry node to a destination node. It is common to represent the connectivity of nodes in a network by means of an undirected (fully duplex) graphs or a directional (simplex) graph. An undirected graph (or simply a graph) of N nodes is called "fully connected" if there is an edge (link) between every pair of nodes, or a directed edge (link) from every node to every other node, when the graph is directed (digraph).

FIG. 1 shows a fully connected digraph with N=4 nodes. Theoretically, a fully connected graph is attractive because it gives the best connectivity (since nodes are directly connected) with the minimum delay (since there is only one hop between nodes). However, it becomes less attractive when the design complexity and fault-tolerance are taken into consideration. To achieve the full connectivity for an undirected graph, a total of N(N−1)/2 connections is required. Obviously, for large N, the number of connections becomes unacceptably large, leading to a very complex interconnection system. When the edge joining a pair of nodes breaks, the communication between these two nodes is basically blocked (unless hopping through other nodes is allowed).

Statement of the Problem Solved

One way of solving the problem, described above, is to use a set of edge-disjoint covering rings (the union of the rings covers the entire graph) as an implementation alternative. FIG. 2 shows a set of four edge-disjoint covering rings for the graph given in FIG. 1. FIG. 3 shows the interconnection network for four processors using the rings shown in FIG. 2. The major difference between FIGS. 1 and 3 is that the data packet is directly routed to its destination in FIG. 1, whereas in FIG. 3, the data packets must be routed along the rings where they belong. There are many advantages of using the approach shown in FIG. 3. Full connectivity is still preserved. The degree of fault-tolerance is increased because the knowledge about alternate paths is known. The routing policy is predetermined. Packets must be routed according to the orientation of the ring they are placed. Data packets can be sent via the least congested path, i.e., the hot spots can be avoided.

The rings described used for system interconnection must satisfy the following constraints:

1. They must be edge-disjoint (as shown in FIG. 2).
2. Their union cover the fully connected graph of (digraph) (the union of the rings in FIG. 2 covers the graph in FIG. 1).
3. No two distinct rings go through the same set of nodes.
4. There are exactly N−1 nodes in each ring, where N is the total number of nodes in the graph.

Although the approach proposed is appealing, it has some difficulty in configuring a set of rings which satisfies the ring constraints, especially when the number of nodes is large. An experiment was conducted to show the significance of this problem. The experiment used an exhaustive search to find a set of rings satisfying the ring constraints described above. More than four hours were required for an IBM System/6000 Model 530 machine to find a ring configuration for N=10. This extraordinary long search time poses a need for a fast ring configurator in order to realize the advantages of edge-disjoint covering rings in a practical network.

SUMMARY OF THE INVENTION

It is therefore an object of the present invention to provide a fast ring configurator for interconnection of data processing and communication systems that can be used to adaptively generate a consistent set of routing tables in each node of the system.

It is a another object of the invention to provide a fast ring configurator for adaptively generating a consistent set of routing tables in each node of a network, facilitating the addition or removal of a node or nodes from the network.

It is a further object of the invention to provide a fast ring configurator which generates a minimum amount of data that needs to be stored at each node in a network to define routing information for the network and which, when supplemented by a histogram of traffic on the network, allows a node to send data packets via a least congested path.

According to the invention, there is provided a fast ring configuration mechanism that can be used to construct a set of covering rings preserving the full connectivity for system interconnect. The mechanism can also be used for establishing the routing table for each interconnected system during the system initialization time.

To generate a set of edge-disjoint rings satisfying the constraints stated above, the invention uses a rotational mechanism similar to the one depicted in FIG. 6. The rings are considered stretching along the horizontal direction with nodes aligned in columns across all the rings as shown in FIG. 6. It has been observed that with a proper relabeling of the nodes, nodes appearing in the same column position of each ring can be obtained by a simple rotation of the nodes from the previous column of the rings. Once the rotational position (called the increment in the invention) is determined for each column, a set of N−1 edge-disjoint rings can be constructed.

To find an extra ring so that when combined with the N−1 rings thus found the ring constraints are satisfied, some node reduction technique (described below) needs to be invoked. The procedure can be repeated until a set of N edge-disjoint rings satisfying the constraints are found.

The fast ring configurator according to the invention enables all users to generate a consistent set of routing tables at each node within the network. The network can have any number of nodes and any number (greater than two) of links on each node. The only restriction is that the link must be directional.

It is not necessary to store the routing tables generated at each node. At a minimum, each node can run the same configuration program to determine the next node for the data packet. Since all nodes run the same program, all nodes will get the same ring configuration; however, rather than storing the routing tables generated by the program, each node simply needs to store predefined ring identifications (IDs) and increments (node position). This minimizes storage requirements at the nodes permitting the storage of additional information relating to traffic, faults and the like, allowing the nodes to select alternate paths.

BRIEF DESCRIPTION OF THE DRAWINGS

The foregoing and other objects, aspects and advantages will be better understood from the following detailed description of a preferred embodiment of the invention with reference to the drawings, in which:

FIG. 3 is the interconnection network for four processors using the rings shown in FIG. 2;

FIG. 4 is a graph showing a "rotation" operation for an example of four rotational positions;

FIG. 5 is a diagram showing a set of rings satisfying the ring constraints for N=5;

FIG. 6 is a diagram illustrating the rotation of nodes according to a basic concept of the invention;

FIGS. 8A, 8B and 8C are is a step by step illustrations for the operation of the ring configurator for N=7;

FIG. 10 illustrates the node reduction technique mentioned in this invention for N=7;

DETAILED DESCRIPTION OF A PREFERRED EMBODIMENT OF THE INVENTION

Figure 1:
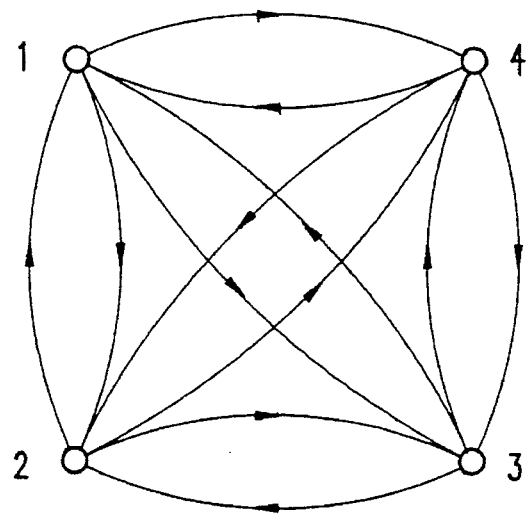
FIG. 1 is a fully connected digraph with N=4 nodes.
Figure 2:
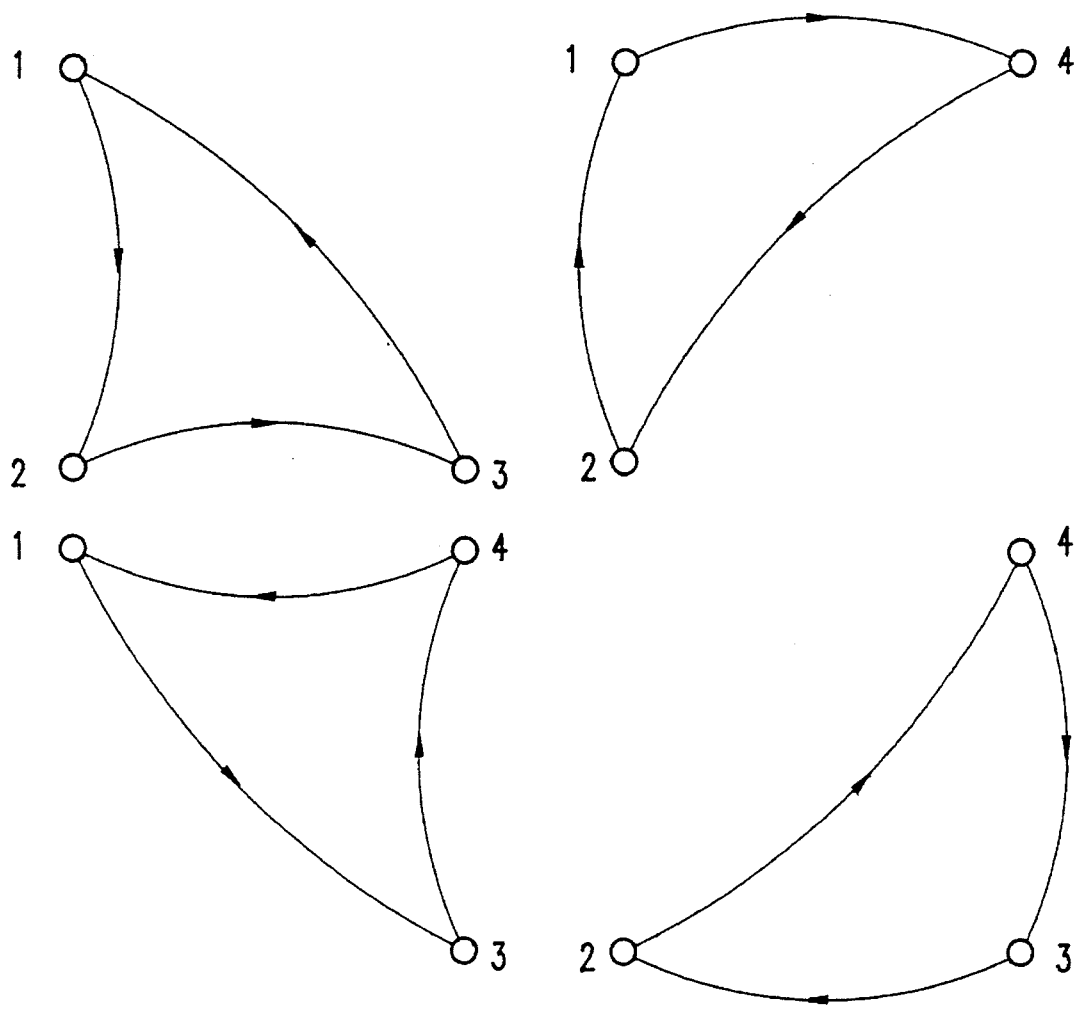
FIG. 2 is a set of four edge-disjoint covering rings.

In a specific example, the invention is disclosed as a "fast ring configurator" which is used to configure a set of covering rings satisfying the ring constraints with N=5 to illustrate the basic concept. The description for the operation of the fast ring configurator for the general case is then given.

For each fixed integer N, N≥4, let A={2, 3, . . . , N} and D={1, 2, . . . , N−2}. Define a special add operator, $\oplus$, from A×D to A as follows: for any i∈A and j∈D, i⊕j=i+j, if i+j≤N; otherwise, i⊕j=i+j−(N−1). Notice that the operator $\oplus$ is in fact a rotation operation for the N−1 number in A with the number of "rotational positions" given in D. This is illustrated by the graph in FIG. 4 for N=5. For example: 3⊕1=4, 3⊕2=5, and 5⊕2=3, for N=5.

FIG. 5 shows a set of rings satisfying the ring constraints for N=5. Concentrating on the first four rings in FIG. 5, notice that we have arranged these rings in such a fashion that all the rings are rooted at (i.e., started from) node 1 (see column 1 in FIG. 5). By relabeling the nodes, we can make the next node of each ring appear in the order 2, 3, 4, 5 (shown in column 2 of FIG. 5). This special arrangement reveals a very interesting observation; to wit, the nodes in column 3 are actually obtained by rotating the nodes in column 2 one position up and the nodes in column 4 are actually obtained by rotating the nodes in column 3 two position up, as shown in FIG. 6. In fact, the nodes in column 3 and 4 are obtained by "adding" (using the operator, $\oplus$, defined above) increments "1" and "2" to columns 2 and 3, respectively. Again, this is illustrated in FIG. 6. It is clear that the entire problem is now reduced to finding "appropriate" increments. Once the increments are determined, the four rings are uniquely determined, providing that four rings are rooted at node 1 and the nodes next to the roots are 2, 3, 4, and 5 respectively. After the four rings are determined, the rest of the graph needs to be checked to determine if it forms a single ring after the removal of the four rings. If the answer is yes, a set of edge-disjoint covering rings satisfying the ring constraints is found; otherwise, new increments need to be found again. In the example for N=5, the answer is yes. The rest of the graph forms a single ring and is shown by the ring below the dotted line in FIG. 5.

The fast ring configurator according to the invention which leads to a set of N rings satisfying the ring constraints is described below. Imagine that these N rings were found and arranged in the same way as that in FIG. 5; i.e., the first N−1 ring are all rooted in node 1 in column 1 and the next nodes in column 2 are 2, 3, . . . , N, respectively. The diagram shown in FIG. 7 called the "ring configurator", will be used as a vehicle for deriving those rings. Notice that the ring configurator resembles the first ring and the corresponding increments depicted in FIG. 6. Our objective is to find N−3 increments $d_1, d_2, \ldots, d_{N-3}$ which can be used to construct a set of N rings satisfying the ring constraints. In order to guarantee this, it is obvious that all the increments must be distinct and all the nodes derived from these increments in the ring configurator must be distinct as well.

The operation of the fast ring configurator according to the invention will be described with reference to FIGS. 7 to 10 (for N=7).

Notations:

D={1, 2, 3, . . . , N−2}

A={2, 3, . . . , N}

$\oplus$=the special add operator defined above

\=set complement (e.g., E\F={element in E but not in F})

Figure 7:
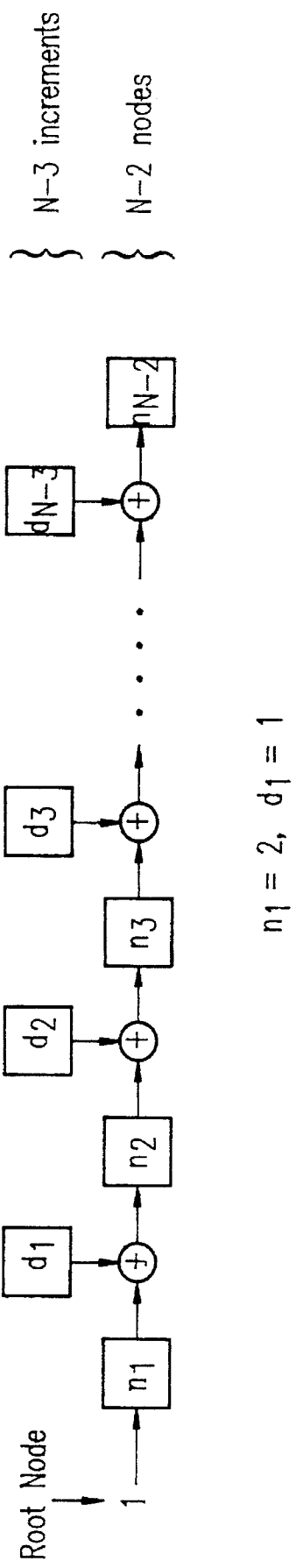
FIG. 7 is a block diagram showing the basic ring configurator according to the invention.

Notice that D is the set of all possible increments for those $d_i$s shown in FIG. 7 and $\{d_1, d_2, \ldots, d_{N-3}\}$ is a subset of D. A is the set of all possible nodes for those $n_i$s shown in FIG. 7 and $\{n_1, n_2, \ldots, n_{N-2}\}$ is a subset of A. As an example for N=7, D={1, 2, 3, 4, 5} and A={2, 3, 4, 5, 6, 7}.

Initialization:

$d_1=1$ $n_1=2$ $n_2=d_1\oplus n_1=3$ $D_1=\{1\}$ $D_k=\emptyset$ for all k=2, 3, ..., N−3 ($D_k$ contains the increments that have been tried so far as candidates for $d_k$.)

i=2

As an example, see the initialization portion of FIG. 8A for N=7. In this case we have $d_1=1$, $n_1=2$, $n_2=3$ (refer to FIG. 7 for the relative positions of $d_1$, $n_1$, and $n_2$, respectively). Since the only candidate for $d_i$s that has been considered so far is $d_1$, $D_1=\{d_1\}=\{1\}$, $D_2=\emptyset$, $D_3=\emptyset$, and $D_4=\emptyset$. We now proceed to search for $d_2$. Let i=2 and go to phase I of the program:

Phase I:

(search for increments)

1°) Let $d_i=\min D\backslash(\{d_1, \ldots, d_{i-1}\}\cup D_i)$. If $D\backslash(\{d_1, \ldots, d_{i-1}\}\cup D_i)=\emptyset$, let $D_i=\cup$, i=i−1, and repeat 1°). Otherwise, let $D_i=D_i\cup\{d_i\}$. Go to 2°).

Note that $d_1$, $d_2$, ..., and $d_i$ always represent the current candidates for the increments.

As an example refer to the first phase I of FIG. 8A for i=2. Since $\{d_1\}\cup D_2=\{1\}$, $D\backslash(\{d_1\}\cup D_2)=\{2,3,4,5\}$. Hence, $d_1=\min\{2, 3, 4, 5\}=2$. Now let $D_2=\{2\}$ and proceed to step 2:

2°) Let $n_{i+1}=n_i\oplus d_i$. If $n_{i+1}\epsilon\{n_1, \ldots, n_1\}$, go to 1°). Otherwise, go to 3°).

Note that $n_1$, $n_2$, ..., and $n_i$ always represent the current candidates for the nodes.

Again, refer to the first phase I of FIG. 8A for i=2. Since $n_2=3$ and $d_2=2$, $n_3=5$. Since node 5 has not shown up so far, we will proceed to step 3 instead of step 1:

3°) If i+1=N−2, go to phase II (keep all $d_k$s, $D_k$s, $n_k$s, and i unchanged). Otherwise, let i=i+1. Go to 1°).

For our example in FIG. 8A for i=2, we have i+1=3, which is less than N−2=5. So let i=i+1=3 and repeat step 1. The rest steps of the first phase I of FIG. 8A can be followed according to the procedure described above.

Phase II: (check to see if the N−1 rings derived from phase I leave the rest of the graph a single ring)

1°) Let $A[k]=2+3+\ldots N-k=[(N^2+N-2)\backslash 2-k]$, for all k=2, 3, ..., N. (A[k] will be reduced in the next step, its last value indicates the node not reachable from k via any of the rings derived from phase I.)

2°) Use the following nested loops to reduce the value of A[k].

```
for k=2 to N do {
    a_1=k;
    for j=1 to N-3 do {
        A[a_j]=A[a_j]-(a_j⊕d_j);
        a_{j+1}=a_j d_j;
    }
}
```

3°) If 2→A[2]→A[A[2]]→...→A[...[A[2]] forms a ring of N−1 nodes, the we have found N rings satisfying the ring constraints. Otherwise repeat phase I (use the last values of $d_k$s, $D_k$s, $n_k$s, and i).

Figure 9A:
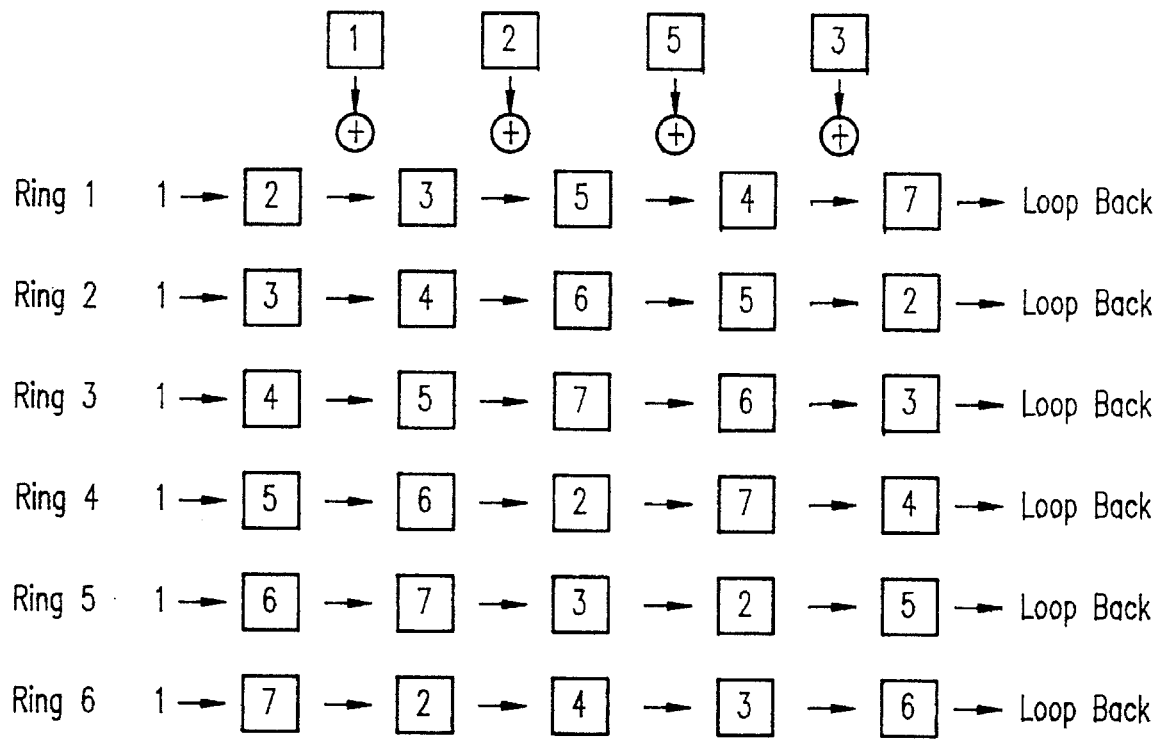
FIGS. 9A and 9B illustrate the coverability (or reachability) of the rings generated from the phase I procedure described in this invention for N=7.
Figure 9B:
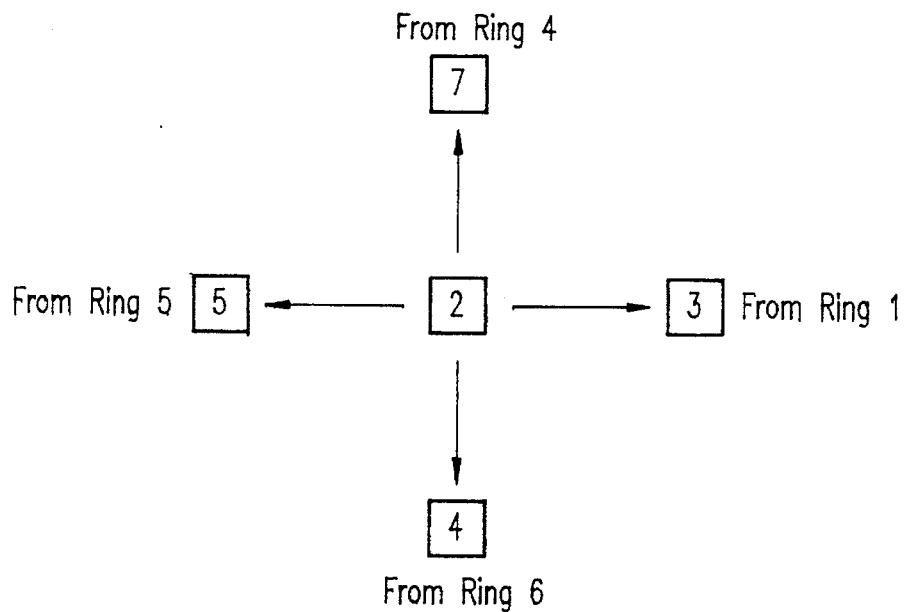

The phase II procedure of FIGS. 8A, 8B and 8C can be best understood by referring to the example shown in FIGS. 9A and 9B (for N=7). As derived from FIG. 8A, the four increments obtained at the completion of the first phase I are $d_1=1$, $d_2=2$, $d_3=5$, and $d_4=3$. As noted before, these increments uniquely determine six edge-disjoint rings for the digraph of N=7. These rings are shown in FIG. 9A.

The whole idea of the phase II procedure is to determine, for each node k, the node which is not reachable ("reachable" means "reachable in a single hop", hereafter) from node k via any one of the rings generated from phase I procedure which, in turn, will be used to determine whether the graph, after the removal of all the rings, constitutes a single ring. Because of our special naming convention and the phase I procedure, the root node is always reachable from any other node (due to the loop back), and vice versa. Therefore, we only need to determine the unreachable node from node k, where k≠1. Obviously, with this restriction, the candidates for the unreachable node are all the nodes except node 1 and node k itself. As an example for N=7, the candidates for the unreachable nodes for k=2 are nodes 3, 4, 5, 6, and 7.

FIG. 9B shows all the reachable nodes from node 2 based on the rings depicted in FIG. 9A. Clearly, node 6 is not reachable. Therefore, the link from node 2 to node 6 should remain in the graph after the removal of all the rings.

One way of tracking down the unreachable node from node k is to delete those reachable nodes from its candidate list as we traverse along the rings. This can be achieved by first computing the sum of the node numbers associated with those nodes in the candidate list (this corresponds to the value A[k] defined in step 1 of phase II, for example A[2]=3+4+5+6+7=25. Then subtract from this sum the node number associated with each node which is reachable from node which is reachable from node k as we traverse along the rings (this corresponds to step 2 of phase II). We refer to this technique the "node reduction" technique in the subsequent discussions.

The method proposed in step 2 of phase II is just a schematic procedure which implements the idea mentioned above. The index k of the outer loop of the pseudocode shown in step 2 indicates the ring that is currently being traversed. For example, k=2 corresponds to the first ring (e.g., ring 1 in FIG. 9A), k=3 corresponds to the second ring (e.g., ring 2 in FIG. 9A), and so forth. The inner loop of the pseudocode corresponds to the node reduction technique mentioned above. To understand its operation, let us consider the first ring in FIG. 9A (which corresponds to k=2 in the outer loop). The directed edges appearing in this ring are 2→3, 3→5, 5→4, and 4→7 (note, ignoring 1→2 and 7→1). Since node 3 is reachable from node 2, 3 should be subtracted off from A[2], i.e. A[2]=A[2]−3. Likewise, 5, 4, and 7 should be subtracted from A[3], A[5], and A[4], respectively. Specifically, the original values for A[2], A[3], A[5], and A[4] are 25, 24, 22, and 23, respectively. After the first round node reduction, the values become 22, 19, 18, and 16, respectively. FIG. 10 shows the detailed steps of this node reduction operation.

After all the rings are traversed, the last value in A[k] indicates the node that is not reachable from node k. For example, if A[k]=n then the edge k→n is not covered and therefore should remain after all the rings are removed from the graph. Step 3 of phase II is a recursive method of checking to see if the edges left over actually constitute a single ring. If they do, then the last edge-disjoint ring is found and therefore all N edge-disjoint rings are found. Otherwise, phases I and II should be repeated. For example, by following the last values of A[k]s shown in FIG. 10, A[2]=6, A[A[2]]=A[6]=4, and A[A[A[2]]]=A[4]=2 (loop back to 2). Hence, we have found a ring 2→6→4→2 which does not cover all the remaining graph (in fact the other ring is 3→7→5→3). According to the criteria stated in step 3 of phase II, the search procedure needs to be repeated from phase I.

FIGS. 8A, 8B, and 8C gives a step by step illustration for the operation of the ring configurator for N=7. The speed improvement of the ring configurator according to the invention is tremendous. It takes only a total of less than fifteen minutes for an IBM RISC System/6000 Model 320 machine to configure a set of edge-disjoint covering rings for N=51 to 60. The tables below shows the results from the fast ring configurator for N=5 to 20. The novel approach of this invention is important for the implementation of a high performance system interconnect using a set of fully covered edge-disjoint ring.

| # Nodes = 5 | # Nodes = 6 | # Nodes = 7 | # Nodes = 8 |
|---|---|---|---|
| 1→2→3→5 | 1→2→3→5→4 | 1→2→3→7→4→6 | 1→2→3→5→8→7→4 |
| 1→3→4→2 | 1→3→4→6→5 | 1→3→4→2→5→7 | 1→3→4→6→2→8→5 |
| 1→4→5→3 | 1→4→5→2→6 | 1→4→5→3→6→2 | 1→4→5→7→3→2→6 |
| 1→5→2→4 | 1→5→2→3→2 | 1→5→6→4→7→3 | 1→5→6→8→4→3→7 |
| 2→5→4→3 | 1→6→2→4→3 | 1→6→7→5→2→4 | 1→6→7→2→5→4→8 |
|  | 2→5→3→6→4 | 1→7→2→6→3→5 | 1→7→8→3→6→5→2 |
|  |  | 2→7→6→5→4→3 | 1→8→2→4→7→6→3 |
|  |  |  | 2→7→5→3→8→6→4 |

Nodes = 9

1→2→3→5→8→4→9→7
1→3→4→6→9→5→2→8
1→4→5→7→2→6→4→9
1→5→6→8→3→7→4→2
1→6→7→9→4→8→4→3
1→7→8→2→5→9→4→4
1→8→9→3→6→2→4→5
1→9→2→4→7→3→4→6
2→9→8→7→6→5→4→3

Nodes = 10

1→2→3→5→8→4→10→9→7
1→3→4→6→9→5→2→10→8
1→4→5→7→10→6→3→2→9
1→5→6→8→2→7→4→3→10
1→6→7→9→3→8→5→4→2
1→7→8→10→4→9→6→5→3
1→8→9→2→5→10→7→6→4
1→9→10→3→6→2→8→7→5
1→10→2→4→7→3→9→8→6
2→6→10→5→9→4→8→3→7

Nodes = 11

1→2→3→5→8→4→9→7→11→10
1→3→4→6→9→5→10→8→2→11
1→4→5→7→10→6→11→9→3→2
1→5→6→8→11→7→2→10→4→3
1→6→7→9→2→8→3→11→5→4
1→7→8→10→3→9→4→2→6→5
1→8→9→11→4→10→5→3→7→6
1→9→10→2→5→11→6→4→8→7
1→10→11→3→6→2→7→5→9→8
1→11→2→4→7→3→8→6→10→9
2→9→6→3→10→7→4→11→8→5

Nodes = 12

1→2→3→5→8→12→6→4→11→10→7
1→3→4→6→9→2→7→5→12→11→8
1→4→5→7→10→3→8→6→2→12→9
1→5→6→8→11→4→9→7→3→2→10
1→6→7→9→12→5→10→8→4→3→11
1→7→8→10→2→6→11→9→5→4→12
1→8→9→11→3→7→12→10→6→5→2
1→9→10→12→4→8→2→11→7→6→3
1→10→11→2→5→9→3→12→8→7→4
1→11→12→3→6→10→4→2→9→8→5
1→12→2→4→7→11→5→3→10→9→6
2→8→3→9→4→10→5→11→6→12→7

Nodes = 13

1→2→3→5→8→12→6→13→11→7→4→9
1→3→4→6→9→13→7→2→12→8→5→10
1→4→5→7→10→2→8→3→13→9→6→11
1→5→6→8→11→4→9→4→2→10→7→12
1→6→7→9→12→4→10→5→3→11→8→13
1→7→8→10→13→5→11→6→4→12→9→2
1→8→9→11→2→6→12→7→5→13→10→3
1→9→10→12→3→7→13→8→6→2→11→4
1→10→11→13→4→8→2→9→7→3→12→5
1→11→12→2→5→9→3→10→8→4→13→6
1→12→13→3→6→10→4→11→9→5→2→7
1→13→2→4→7→11→5→12→10→6→3→8
2→13→12→11→10→9→8→7→6→5→4→9

Nodes = 14

1→2→3→5→8→12→4→10→7→14→13→11→6
1→3→4→6→9→13→5→11→8→2→14→12→7
1→4→5→7→10→14→6→12→9→3→2→13→8
1→5→6→8→11→2→7→13→10→4→3→14→9
1→6→7→9→12→3→8→14→11→5→4→2→10
1→7→8→10→13→4→9→2→12→6→5→3→11
1→8→9→11→14→5→10→3→13→7→6→4→12
1→9→10→12→2→6→11→4→14→8→7→5→13
1→10→11→13→3→7→12→5→2→9→8→6→14
1→11→12→14→4→8→13→6→3→10→9→7→2
1→12→13→2→5→9→14→7→4→11→10→8→3
1→13→14→3→6→10→2→8→5→12→11→9→4
1→14→2→4→7→11→3→9→6→13→12→10→5
2→11→7→3→12→8→4→13→9→5→14→10→6

Nodes = 15

1→2→3→5→8→12→4→9→6→13→11→7→15→10
1→3→4→6→9→13→5→10→7→14→12→8→2→11

1→4→5→7→10→14→6→11→8→15→13→9→3→12
1→5→6→8→11→15→7→12→9→2→14→10→4→13
1→6→7→9→12→2→8→13→10→3→15→11→5→14
1→7→8→10→13→3→9→14→11→4→2→12→6→15
1→8→9→11→14→4→10→15→12→5→3→13→7→2
1→9→10→12→15→5→11→2→13→6→4→14→8→3
1→10→11→13→2→6→12→3→14→7→5→15→9→4
1→11→12→14→3→7→13→4→15→8→6→2→10→5
1→12→13→15→4→8→14→5→2→9→7→3→11→6
1→13→14→2→5→9→15→6→3→10→8→4→12→7
1→14→15→3→6→10→2→7→4→11→9→5→13→8
1→15→2→4→7→11→3→8→5→12→10→6→14→9
2→15→14→13→12→11→10→9→8→7→6→5→4→3

Nodes = 16

1→2→3→5→8→12→4→9→4→15→10→7→16→14→13→6
1→3→4→6→9→13→5→10→1→6→1→8→15→10→7
1→4→5→7→10→14→6→11→2→12→9→3→16→11→8
1→5→6→8→4→11→15→7→12→3→13→10→4→2→12→9
1→6→7→9→12→16→8→13→4→14→11→5→3→2→10
1→7→8→10→13→2→9→14→5→15→12→6→4→3→11
1→8→9→11→14→3→10→15→6→16→13→7→5→4→12
1→9→10→12→15→4→11→16→7→2→14→8→6→5→13
1→10→11→13→16→5→12→2→8→3→15→9→7→6→14
1→11→12→14→2→6→13→3→9→4→16→10→8→7→15
1→12→13→15→3→7→14→4→10→5→2→11→9→8→16
1→13→14→16→4→8→15→5→11→6→3→12→10→9→2
1→14→15→2→5→9→16→6→12→7→4→13→11→10→3
1→15→16→3→6→10→2→7→13→5→14→12→11→4
1→15→2→4→7→11→3→8→14→9→6→15→13→12→5
2→13→9→5→16→12→8→4→15→11→7→3→14→10→6

Nodes = 17

1→2→3→5→8→12→17→7→14→6→15→9→4→16→13→11
1→3→4→6→9→13→2→8→15→7→16→10→5→17→14→12
1→4→5→7→10→14→3→9→16→8→17→11→6→2→15→13
1→5→6→8→11→15→4→10→17→9→2→12→7→3→16→14
1→6→7→9→12→16→5→11→2→10→3→13→8→4→17→15
1→7→8→10→13→17→6→12→3→11→4→14→9→5→2→16
1→8→9→11→14→2→7→13→4→12→5→4→15→10→6→3→17
1→9→10→12→15→3→8→14→5→13→6→16→11→7→4→2
1→10→11→13→16→4→9→15→16→14→7→17→12→8→5→3
1→11→12→14→17→5→10→16→7→15→8→2→13→9→6→4
1→12→13→15→2→6→11→17→8→16→9→3→14→10→7→5
1→13→14→16→3→7→12→2→9→17→10→4→15→11→8→6
1→14→15→17→4→8→13→3→1→2→11→5→16→12→9→7
1→15→16→2→5→9→14→4→11→3→12→6→17→13→10→8
1→16→17→3→6→10→15→5→12→4→13→7→2→14→11→9
1→17→2→4→7→11→16→6→13→5→14→8→3→15→12→10
2→17→16→15→14→13→12→11→10→9→8→7→6→5→4→3

Nodes = 18

1→2→3→5→8→12→17→6→13→4→14→9→7→18→15→11→10
1→3→4→6→9→13→18→7→14→5→15→10→8→2→16→12→11
1→4→5→7→10→14→2→8→15→6→16→11→9→3→17→13→12
1→5→6→8→11→15→3→9→16→7→17→12→10→4→18→14→13
1→6→7→9→12→16→4→10→17→8→18→13→11→5→2→15→14
1→7→8→10→13→17→5→11→18→9→2→14→12→6→3→16→15
1→8→9→11→14→18→6→12→2→10→3→15→13→7→4→17→16
1→9→10→12→15→2→7→13→3→11→4→16→14→8→5→18→17
1→10→11→13→16→3→8→14→4→12→5→17→15→9→6→2→18
1→11→12→14→17→4→9→15→5→13→6→18→16→10→7→3→2
1→12→13→15→18→5→10→16→6→14→7→2→17→11→8→4→3
1→13→14→16→2→6→11→17→7→15→8→3→18→12→9→5→4
1→14→15→17→3→7→12→18→8→16→9→4→2→13→10→6→5
1→15→16→18→4→8→13→3→2→9→17→10→5→3→14→11→7→6
1→16→17→2→5→9→14→3→10→18→11→6→4→15→12→8→7
1→17→18→3→6→10→15→4→11→2→12→7→5→16→13→9→8
1→18→2→4→7→11→16→5→12→3→13→8→6→17→14→10→9
2→13→3→12→4→13→5→14→6→15→7→16→8→17→9→18→10

Nodes = 19

1→2→3→5→8→12→17→6→14→7→13→11→10→4→18→9→19→16
1→3→4→6→9→13→18→7→15→8→14→12→11→5→19→10→2→17
1→4→5→7→10→14→19→8→16→9→15→13→12→6→2→11→3→18
1→5→6→8→11→15→2→9→17→10→16→14→13→7→3→12→4→19
1→6→7→9→12→16→3→10→18→11→17→15→14→8→4→13→5→2
1→7→8→10→13→17→4→11→19→12→18→16→15→9→5→14→6→3
1→8→9→11→14→18→5→12→2→13→19→17→16→10→6→15→7→4
1→9→10→12→15→19→6→13→3→14→2→18→17→11→7→16→8→5

-continued

```
1→10→11→13→16→2→7→14→4→15→3→19→18→12→8→17→9→6
1→11→12→14→17→3→8→15→5→16→4→2→19→13→9→18→10→7
1→12→13→15→18→4→9→16→6→17→5→3→2→14→10→19→11→8
1→13→14→16→19→5→10→17→7→18→6→4→3→15→11→2→12→9
1→14→15→17→2→6→11→18→8→19→7→5→4→16→12→3→13→10
1→15→16→18→3→7→12→19→9→2→8→6→5→17→13→4→14→11
1→16→17→19→4→8→13→2→10→3→9→7→6→18→14→5→15→12
1→17→18→2→5→9→14→3→11→4→10→8→7→19→15→6→16→13
1→18→19→3→6→10→15→4→12→5→11→9→8→2→16→7→17→14
1→19→2→4→7→11→16→5→13→6→12→12→9→3→17→8→18→15
2→15→10→5→18→13→8→3→16→11→6→19→14→9→4→17→12→7
# Nodes = 20

1→2→3→5→8→12→17→4→11→19→9→20→14→13→10→6→18→16→7
1→3→4→6→9→13→18→5→12→20→10→2→15→14→11→7→19→17→8
1→4→5→7→10→14→19→6→13→2→11→3→16→15→12→8→20→18→9
1→5→6→8→11→15→20→7→14→3→12→4→17→16→13→9→2→19→10
1→6→7→9→12→16→2→8→15→4→13→5→18→17→14→10→3→20→11
1→7→8→10→13→17→3→9→16→5→14→6→19→18→15→11→4→2→12
1→8→9→11→14→18→4→10→17→6→15→7→20→19→16→12→5→3→13
1→9→10→12→15→19→5→11→18→7→16→8→2→20→17→13→6→4→14
1→10→11→13→16→20→6→12→19→8→17→9→3→2→18→14→7→5→15
1→11→12→14→17→2→7→13→20→9→18→10→4→3→19→15→8→6→16
1→12→13→15→18→3→8→14→2→10→19→11→5→4→20→16→9→7→17
1→13→14→16→19→4→9→15→3→11→20→12→6→5→2→17→10→8→18
1→14→15→17→20→5→10→16→4→12→2→13→7→6→3→18→11→9→19
1→15→16→18→2→6→11→17→5→13→3→14→8→7→4→19→12→10→20
1→16→17→19→3→7→12→18→6→14→4→15→9→8→5→20→13→11→2
1→17→18→20→4→8→13→19→7→15→5→16→10→9→6→2→14→12→3
1→18→19→2→5→9→14→20→8→16→6→17→11→10→7→3→15→13→4
1→19→20→3→6→10→15→2→9→17→7→18→12→11→8→4→16→14→5
1→20→2→4→7→11→16→3→10→18→8→19→13→12→9→5→17→15→6
2→16→11→6→20→15→10→5→19→14→9→4→18→13→8→3→17→12→7
```

In some applications, a fully connected condition is difficult to satisfy. In the practice of the invention, "fully connected" is not a required condition. The procedure is to assume a fully connected network and then apply the fast ring configurator according to the invention to decompose the fully connected network. For a nonsaturated network, we can select a subset of the set of edge-disjoint rings decomposed by the fast ring configurator under the "fully connected" assumption and make sure the selected subset is composed by (N−1)×R edges, where R is the number of selected rings, is less than N×E edges, where 2E is the number of edges on each node and E<N−1 for satisfying the non-saturated condition. Furthermore, assuming Y=(N×E)−((N−1)×R, then Y<(N−1). In other words, the remaining edges can not be used to formulate another ring with N−1 nodes.

When using the fast ring configurator according to the invention, the resulting network topology looks like a fully connected directed graph. No prior art has described a method to systematically decompose a fully connected digraph. A fully connected graph (with N nodes and 2(N−1) edges per node) is not trivial to produce to satisfy the four conditions set out in the "Statement of the Problem Solved" above. In addition, the characteristics that make them different is the packet routing. A packet in a fully connected graph can be routed from one node to any other node in any number of hops. This, however, makes the routing difficult and the congestion is inevitable. The fast ring configurator of the invention, on the other hand, simplifies routing. Once the ring identification (ID) is assigned to a packet, its routing is straightforward, as it can go only one direction along the ring.

The routing tables are generated at each node, typically at system initialization or boot. The necessary information for running the fast ring configurator program at each node is the node ID and the number of nodes. This information may be stored at the node or downloaded from a master node in the initialization process. Likewise, if a node or nodes are added to or removed from the network, an interrupt is sent to all nodes in the network from a master node followed by the new number of nodes and a reconfigure command to run the fast ring configurator program.

It is not necessary to store the routing tables generated at each node. At a minimum, each node runs the configurator program (phase I and phase II) to determine the next node for the packet. Since the same program is run at each node, all nodes will generate the same ring configuration. A predefined ring ID is assigned to each ring. With reference again to FIG. 5, one possible ring ID assignment for N=5 is to use the number in column 2 with the last number in the column being changed to 1.

An alternative implementation is to have each node run the fast ring configurator program during system boot. Only the increments from phase I need to be stored by each node. The next node for each packet can be determined from these increments and the ring ID. As an example with continued reference to FIG. 5, for N=5 with the ID determined as above, a packet routed to node 4 on ring ID=3 has the next node 4⊕2=6−4=2. A packet with ring ID assignment equal to 1 can get the next node assignment using the method described in phase II.

The foregoing implementation example may require excessive computations to identify all the nodes on the ring identified by the ring ID. Another possible implementation is to have each node also store its relative position on each ring. For example, if the positions for N=5 are assigned as 0 to 3, as opposed to 1 to 4 as shown in columns of FIG. 5, node 5 would store its relative position in each ring as follows:

| Ring ID | Position |
|---------|----------|
| 2 | 3 |
| 3 | — |
| 4 | 2 |
| 5 | 1 |
| 1 | 1 |

If a packet routed to node 5 has a ring ID of 2, then since the position for node 5 in ring ID 2 is 3 (i.e., N−2), node 5 must loop back to node 1. Thus, the packet will be routed to node 1. If the ring ID is 4, then since the position is 2, the next node is $5 \oplus d_2 = 5 \oplus 2 = 7-4 = 3$. If the ring ID is 5, then since the position is 1, the next node is $5 \oplus d_1 = 5 \oplus 1 = 6-4 = 2$. From these examples, it will be understood that for this implementation, the routing information for a data packet may be contained in its header as the ring ID and position information.

Figure 11:
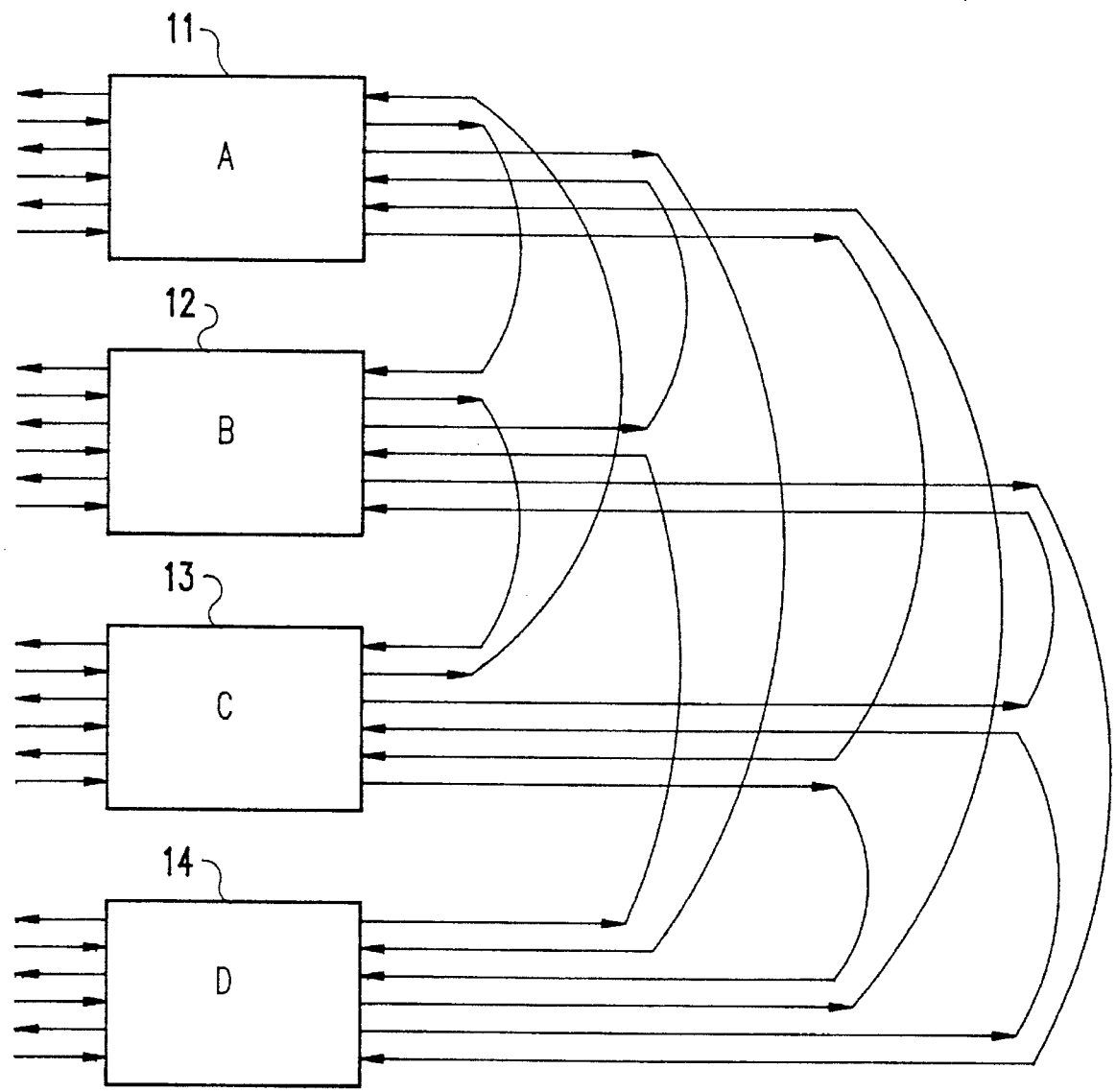
FIG. 11 is a block diagram, similar to FIG. 3, illustrating a specific example of a switch matrix in a network implementing the fast ring configurator according to the invention.
Figure 12:
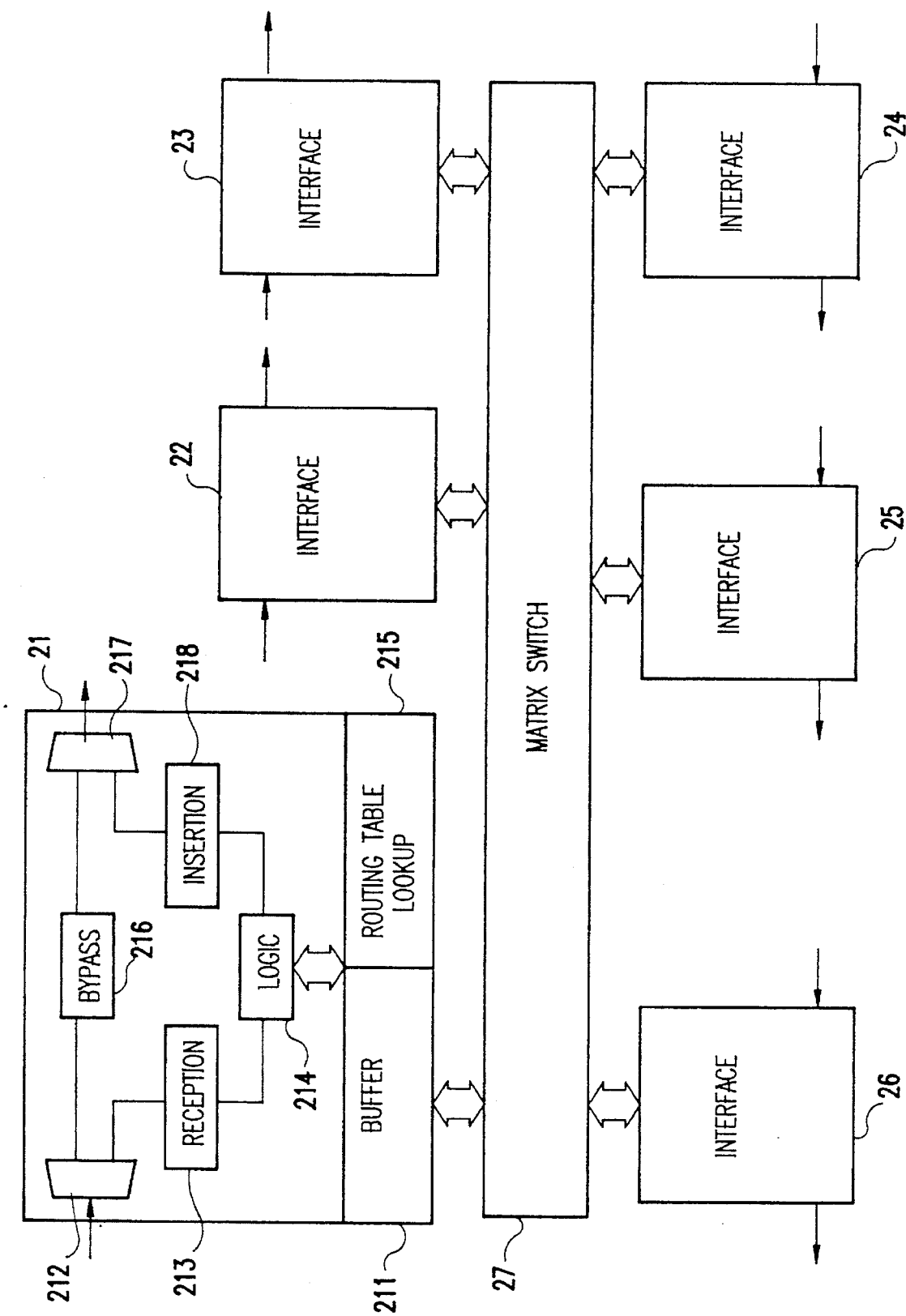
FIG. 12 is a block diagram of the structure of a 6×6 switch matrix as used in the network of FIG. 11.

Consider a specific example of an application of the invention as illustrated in FIGS. 11 and 12. In FIG. 11, which is similar to FIG. 3, there are four 6×6 matrix switches 11, 12, 13 and 14. The front end (left side in the drawing figure) of each switch is dedicated for user interfaces and the back-end is used for interswitch connections. The front-end port design and the back-end port design are identical; therefore, by adding extra ports or by redeploying the number of front-end and back-end ports, the connectivity and the bandwidth of the system can be adjusted. It is a scalable system. The back-end connections are generated by the fast ring configurator as described above.

In FIG. 12, there is shown a structural diagram of one of the 6×6 switches. There six identical port interfaces 21 to 26 which are interconnected to a switch matrix 27. Since the interfaces are identical, only the construction of interface 21 will be described in detail. The interface is connected to the switch matrix 27 via a buffer 211 that provides temporary storage for a data packet being routed to or from the switch matrix. An incoming data packet may be routed by input selector 212 to the buffer 211 by way of reception buffer 213 and routing logic 214. The routing logic 214 has access to information in routing table lookup 215 in order to appropriately modify the header in the data packet. Alternatively, the incoming data packet may be passed by input selector 212 to bypass function 216 to output selector 217, thus effectively bypassing the port. The determination to bypass the port may be from a comparison of the data packet header with local ID information. Data packets received from the switch matrix 27 are passed by the routing logic 214 to an insertion buffer 218. The contents of this buffer is selected by the output selector 217.

The construction shown in FIG. 12 is based on the assumption that the directional link is a buffer-insertion ring. Upon receiving a packet, before the packet is stored in the reception buffer 213, a decision must be made on whether to keep the packet on the same ring (i.e., passed to bypass function 215) or fetch it in. When the packet is fetched and stored in the reception buffer 213, the routing logic 214 determines the shortest path or the least used path for the packet to reach its destination port. The routing may be only within a switch or a jump from one switch block to another via the back-end connections.

The advantages of the fast ring configurator according to the invention are threefold:

1. It is flexible, handling any combination of vertices and edges (where the number of vertices >½ the number of edges per node).

2. A routing table generated at a node by the fast ring configurator is the same as other tables generated at other nodes.

3. The routing table generated by the fast ring configurator provides multiple paths between two nodes. This feature provides the mechanism to solve a. the network congestion problem, i.e., an individual node is overloaded, and b. the network flow control issue, i.e., how to avoid an overheated link (edge) between two nodes.

When problems a and b are solved, then the bandwidth and other resources within a network are fully utilized. These problems are solved because, in each node, it is possible to have the full scope of the network with the ability provided by the fast ring configurator; therefore, each node can identify the optimized path between two nodes. Furthermore, it is not necessary to keep a routing table with all alternate paths. The routing table can simply be generated by the fast ring configurator only when it is needed. The by product is the fault tolerant feature being automatically introduced to the network where the fast ring configurator resides.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A ring configurator method for interconnection of nodes by edges in a network wherein data packets are transmitted from an origination node to a destination node, said method comprising the steps of:

storing at each node information defining the number of nodes and the number of edges on each node in the network; and generating at each node a consistent set of routing tables for routing said data packets within said network only when said tables are required to configure or reconfigure the network.

2. The ring configurator method recited in claim 1 wherein said step of generating including decomposing the fully connected network into rings, assuming a fully connected network, to meet the following three constraints:

a. the rings are edge-disjoint, b. the union of the rings covers a fully connected graph of the network, and c. no two distinct rings go through the same set of nodes.

3. The ring configurator method recited in claim 2 further comprising the step of selecting a subset which is composed of (N−1)×R edges (where N is the number of nodes and R is the number of selected rings) is less than N×E edges (where 2E is the number of edges on each node and E<N−1 for satisfying the non-saturated condition.

4. The ring configurator method recited in claim 1 wherein the step of decomposing meets the constraint that there are exactly N−1 nodes in each ring, where N is the total number of nodes in the graph.

5. A method for adaptively configuring a network composed of a plurality of nodes interconnected by a plurality of edges wherein data packets are transmitted from an origination node to a destination node, said method comprising the steps of:

supplying to each node in the network information defining the number of nodes, the number of edges on each node and a unique identification number to each node in the network;

at network initialization, running a program at each node of the network to generate a consistent set of routing tables for routing said data packets within said network; and storing at each node information from the generation of said routing tables from which routing decisions can be made for data packets received at the node.

6. The method for adaptively configuring a network as recited in claim 5 wherein the network is reconfigured upon a change in the number of nodes and edges in the network, further comprising the steps of:

sending an interrupt to each node in the network;

supplying each node in the network with a new number of nodes and edges on each node in the network; and reinitializing the network by running said program at each node of the network to generate a new consistent set of routing tables for routing said data packets within said network.

7. A method for adaptively configuring a network composed of a plurality of nodes interconnected by a plurality of edges wherein data packets are transmitted from an origination node to a destination node, said method comprising the steps of:

supplying to each node in the network information defining the number of nodes and the number of edges on each node in the network, wherein said information defining the number of nodes and the number of edges on each node in the network is stored at each node;

at network initialization, running a program at each node of the network to generate a consistent set of routing tables for routing said data packets within said network; and storing at each node information from the generation of said routing tables from which routing decisions can be made for data packets received at the node.

8. A method for adaptively configuring a network composed of a plurality of nodes interconnected by a plurality of edges wherein data packets are transmitted from an origination node to a destination node, said method comprising the steps of:

supplying to each node in the network information defining the number of nodes and the number of edges on each node in the network, wherein said information defining the number of nodes and the number of edges on each node in the network is supplied to each of said nodes from a central source at network initialization;

at network initialization, running a program at each node of the network to generate a consistent set of routing tables for routing said data packets within said network; and storing at each node information from the generation of said routing tables from which routing decisions can be made for data packets received at the node.

9. A method for adaptively configuring a network composed of a plurality of nodes interconnected by a plurality of edges wherein data packets are transmitted from an origination node to a destination node, said method comprising the steps of:

supplying to each node in the network information defining the number of nodes and the number of edges on each node in the network;

at network initialization, running a program at each node of the network to generate a consistent set of routing tables for routing said data packets within said network, said program including the steps of searching for increments by which nodes in the network may be rotated to define a plurality of rings in said network, checking rings in the network derived by the increments to determine if one less than a total number of rings when removed from the network leaves a single complete ring, if a single complete ring is left, storing the increments, otherwise repeating the searching and checking steps; and storing at each node information from the generation of said routing tables from which routing decisions can be made for data packets received at the node.

\* \* \* \* \*